US008623569B2

(12) United States Patent
Gottmann et al.

(10) Patent No.: US 8,623,569 B2
(45) Date of Patent: Jan. 7, 2014

(54) FUEL CELL SEALS

(75) Inventors: Matthias Gottmann, Sunnyvale, CA (US); Stephen Couse, Sunnyvale, CA (US); Tad Armstrong, Burlingame, CA (US); Emad El Batawi, Sunnyvale, CA (US); Martin Janousek, Sunnyvale, CA (US); Ananda H. Kumar, Fremont, CA (US)

(73) Assignee: Bloom Energy Corporation, Sunnyvale, CA (US)

( * ) Notice: Subject to any disclaimer, the term of this patent is extended or adjusted under 35 U.S.C. 154(b) by 802 days.

(21) Appl. No.: 12/591,986

(22) Filed: Dec. 7, 2009

(65) Prior Publication Data
US 2010/0159344 A1    Jun. 24, 2010

Related U.S. Application Data

(60) Provisional application No. 61/193,596, filed on Dec. 9, 2008.

(51) Int. Cl.
*H01M 2/20* (2006.01)
*H01M 2/08* (2006.01)

(52) U.S. Cl.
USPC .......................................... 429/469; 429/508

(58) Field of Classification Search
None
See application file for complete search history.

(56) References Cited

U.S. PATENT DOCUMENTS

| | | |
|---|---|---|
| 3,615,851 A | 10/1971 | Eysel |
| 5,589,285 A | 12/1996 | Cable et al. |
| 5,948,221 A | 9/1999 | Hsu |
| 5,972,285 A | 10/1999 | Knott |
| 6,096,451 A | 8/2000 | Shiratori et al. |
| 6,280,869 B1 | 8/2001 | Chen |
| 6,302,402 B1 | 10/2001 | Rynders et al. |
| 6,492,053 B1* | 12/2002 | Donelson et al. ............. 429/458 |
| 6,532,769 B1 | 3/2003 | Meinhardt et al. |
| 6,605,316 B1 | 8/2003 | Visco et al. |
| 6,635,375 B1 | 10/2003 | Geisbrecht et al. |
| 6,692,859 B2 | 2/2004 | Mukerjee et al. |
| 6,740,441 B2 | 5/2004 | Jacobson et al. |
| 6,902,798 B2 | 6/2005 | Ghosh et al. |
| 7,144,651 B2 | 12/2006 | Finn et al. |
| 2002/0055028 A1 | 5/2002 | Ghosh et al. |
| 2003/0157386 A1 | 8/2003 | Gottmann et al. |
| 2003/0203267 A1 | 10/2003 | Chou et al. |
| 2003/0215689 A1* | 11/2003 | Keegan ......................... 429/35 |
| 2003/0224238 A1* | 12/2003 | Finn et al. ..................... 429/35 |
| 2004/0072039 A1 | 4/2004 | Jankowski et al. |
| 2005/0175882 A1 | 8/2005 | Sasahara et al. |
| 2006/0096632 A1* | 5/2006 | Oswald ....................... 136/251 |

(Continued)

OTHER PUBLICATIONS

U.S. Appl. No. 12/292,078, filed Nov. 12, 2008, Kumar et al.

(Continued)

*Primary Examiner* — Patrick Ryan
*Assistant Examiner* — Muhammad Siddiquee
(74) *Attorney, Agent, or Firm* — The Marbury Law Group PLLC

(57) ABSTRACT

A fuel cell stack includes a plurality of fuel cells, a plurality of interconnects, and a plurality of seal members, wherein the plurality of seal members comprises one or more first seal members and one or more additional seal members, where the one or more first seal members form a protective barrier between the reducing environment contained with the fuel cell stack and the remaining seal members.

14 Claims, 5 Drawing Sheets

(56) References Cited

U.S. PATENT DOCUMENTS

| | | |
|---|---|---|
| 2006/0246333 A1 | 11/2006 | Schaevitz et al. |
| 2007/0003821 A1 | 1/2007 | Belchuk |
| 2007/0037058 A1 | 2/2007 | Visco et al. |
| 2008/0026280 A1 | 1/2008 | Thompson et al. |
| 2008/0131739 A1* | 6/2008 | Badding et al. ................ 429/13 |
| 2009/0286664 A1* | 11/2009 | Drake et al. ................ 501/15 |

OTHER PUBLICATIONS

Office Action mailed Aug. 12, 2009 received in U.S. Appl. No. 12/382,173.

Office Action mailed Jan. 27, 2010 received in U.S. Appl. No. 12/382,173.

* cited by examiner

FUEL CELL SEALS

CROSS REFERENCE TO RELATED PATENT APPLICATIONS

The present application claims benefit of U.S. provisional application 61/193,596, filed Dec. 9, 2008, which is incorporated herein by reference in its entirety.

FIELD OF THE INVENTION

The present invention is generally directed to fuel cell components and more specifically to multiple member protected anode fuel cell seals.

BACKGROUND OF THE INVENTION

Fuel cells are electrochemical devices which can convert energy stored in fuels to electrical energy with high efficiencies. High temperature fuel cells include solid oxide and molten carbonate fuel cells. These fuel cells may operate using hydrogen and/or hydrocarbon fuels. There are classes of fuel cells, such as the solid oxide reversible fuel cells, that also allow reversed operation, such that water or other oxidized fuel can be reduced to unoxidized fuel using electrical energy as an input.

In a high temperature fuel cell system such as a solid oxide fuel cell (SOFC) system, an oxidizing flow is passed through the cathode side of the fuel cell while a reducing flow is passed through the anode side of the fuel cell. The oxidizing flow is typically air, while the reducing flow typically comprises a mixture of a hydrogen-rich gas created by reforming a hydrocarbon fuel source and water vapor. The fuel cell, typically operating at a temperature between 750° C. and 950° C., enables the transport of negatively charged oxygen ions from the cathode flow stream to the anode flow stream, where the ions combine with either free hydrogen or hydrogen in a hydrocarbon molecule to form water vapor and/or with carbon monoxide to form carbon dioxide. The excess electrons from the negatively charged ions are routed back to the cathode side of the fuel cell through an electrical circuit completed between anode and cathode, resulting in an electrical current flow through the circuit.

Fuel cell stacks are frequently built from a multiplicity of cells in the form of planar elements, tubes, or other geometries. Fuel cell stacks, particularly those with planar geometry, often use seals between electrolyte and interconnect surfaces to contain fuel and air at various locations within the stack. While it is desirable for seals to be effective at start up temperatures to prevent escape (and potential ignition) of fuel gasses, these seals must maintain their operating integrity at high operating temperatures and in an oxidizing, reducing, or mixed (i.e., oxidizing on one side on one side of the seal and reducing on the other) environment. Expansion and contraction of fuel cell stack components (including seals) due to thermal cycling or compression should not result in damage to any of the components during a seal's expected life.

Many types of seals used at elevated temperatures, such as brazes and metal gaskets, often have a limited life, tolerating only a relatively few number of thermal cycles before they fail to maintain a hermetic seal due to differences in the coefficients of thermal expansion (CTE) that result in mechanical stresses that can lead to failure of the seal or the components of the assembly. Some assemblies are difficult to seal with brazes or gaskets because of operating conditions or material incompatibilities. Also, brazes and metal gaskets often present difficulties and high costs of fabrication and assembly due to the tighter tolerances which are required, in flatness for example, to ensure formation of a hermetic seal.

Many compliant seals, such as elastomeric o-rings and gaskets, form hermetic seals at start up temperatures, do not crack and tend to absorb stresses in an assembly that arise from thermal expansion and compression. However, these seals cannot be used in high temperature conditions because the elastomeric materials used in them decompose, degrade, or oxidize at high temperatures.

SUMMARY OF THE INVENTION

An embodiment of a first aspect of the present invention provides a method of sealing a fuel cell stack comprising forming a seal with a metal seal member and one or more additional seal members; wherein said metal seal member is exposed to a reducing environment in the interior of the fuel cell system.

An embodiment of the second aspect of the invention includes a method of operating a fuel cell stack, said method comprising providing fuel into a fuel cell stack, providing air into a fuel cell stack, allowing fuel to permeate through a secondary seal from at least one fuel channel in a first interconnect into a chamber located in the fuel cell stack between a primary and the secondary seals, and allowing air to flow into the chamber from an air channel in a second interconnect through an opening in the electrolyte to form a protective environment in the chamber for the primary seal.

An embodiment of the third aspect of the invention includes fuel cell stack comprising a plurality of fuel cells, a plurality of interconnects, one or more first seal members comprising a first seal material which are located within the fuel cell stack in fuel flow areas, and one or more second seal members comprising a second seal material different from the first seal material which are located within the fuel cell stack in air flow areas. The one or more first seal members are more chemically stable in a reducing environment than the one or more second seal members, and the one or more second seal members are better coefficient of thermal expansion (CTE) matched to the fuel cells and interconnects than the one or more first seal members.

DETAILED DESCRIPTION OF THE INVENTION

Figure 1A:
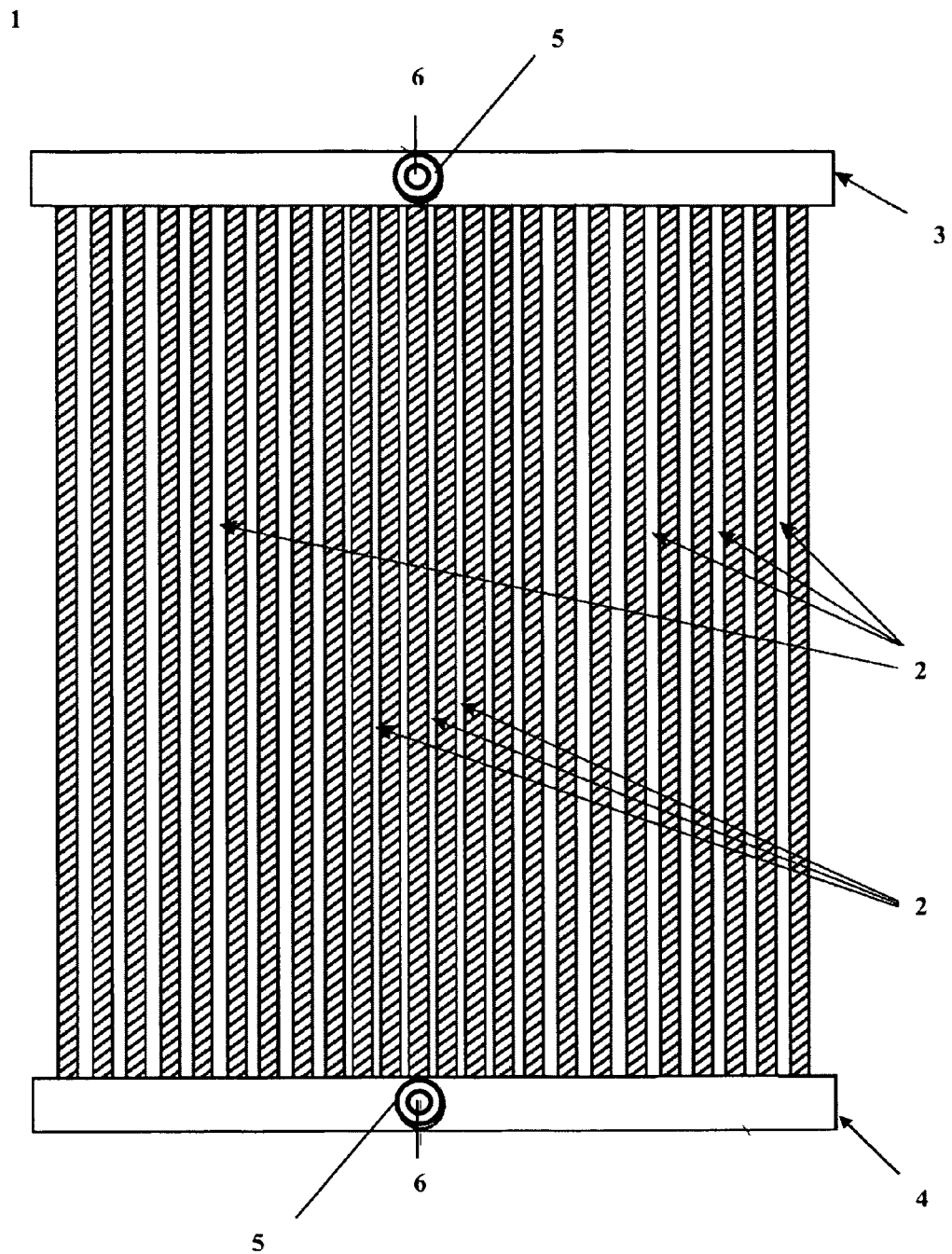
FIG. 1A is a top view of an exemplary interconnect from a SOFC with a multiple member donut barrier seal.

Unless otherwise noted, as used herein, the term "forming an effective seal" does not require the formation of a perfectly hermetic seal. Rather, forming an effective seal indicates that a seal member is defining the boundary of a pressure differential or is forming a physical deterrent to substantial gas flow from one side of the seal to the other. As used herein, a "semipermeable seal" is an effective seal in that it allows it allows some transfer of gas flow from one side of the seal to the other while maintaining a physical deterrent to substantial gas flow across the seal. Conversely, a "hermetic seal" is a seal that prevents substantially all gas movement across the boundary defined by the seal. Such seals may be referred to herein as impermeable seals.

As used herein, the terms "inside" or "inner" describe the position of one seal member relative to another in a multiple member seal where the inside or inner seal member is at a position closer to the interior of the sealed area. Conversely, the outer or outside member is at a position closer to the outside of the sealed area.

As used herein, the term "typical SOFC operating temperature" includes a temperature that falls within the range of 750° C. to 950° C., inclusive.

As used herein, a seal member's thickness is the distance between two elements in contact with the seal member. In the case of a SOFC, the two elements may be two planar stack elements that form a top and bottom of the seal member.

As used herein, a seal member's width is the distance from the inside of the sealed area to the outside of the sealed area.

As used herein, a seal in a "mixed environment" has a reducing environment on one side of the seal and an oxidizing environment on the other. In a SOFC, the reducing environment is the fuel/water mixture within the fuel cell system and the oxidizing environment is either the outside of the fuel cell system or a portion of the oxidizing flow within the fuel cell system.

Certain glass and glass ceramic compounds have been shown to be able to provide robust high temperature seals and have coefficients of thermal expansion (CTE) that are well matched with the those of electrolytes and interconnects used in typical SOFCs. This CTE matching is important to minimize mechanical stresses that would otherwise lead to cell cracking and delamination during thermal cycling. However, well CTE-matched glass and glass ceramic seals typically have a shortcoming in that their effectiveness diminishes with prolonged operation in a high temperature reducing environment, such as the fuel/water mixture in a SOFC. It is therefore desirable to have a method of sealing a fuel cell system with a CTE-matched glass or glass ceramic high temperature seal, yet reducing contact of chemically vulnerable glass or glass ceramic seals and the high temperature reducing environment of the SOFC.

The inventors realized that a plurality of seal members with dissimilar compositions, performance characteristics, and chemical vulnerabilities to reducing environments can be utilized together to form fuel cell seals that are effective at containing high temperature reducing environments within a SOFC system. Seal materials useful in the present invention that are not chemically vulnerable to reducing environments at typical SOFC operating temperatures need not be able to form and maintain hermetic seals at these temperatures. Conversely, seal materials useful in the present invention that are capable of forming and maintaining hermetic seals at typical SOFC operating temperatures need not be chemically invulnerable to reducing environments at the same temperatures.

Seals useful in all aspects of the present invention can be constructed in any geometric shape necessary for their application. For example, a SOFC stack may contain multiple fuel cells, manifolds for fuel and/or air, and various internal interconnects. At the junction of each of these components, a distinctively shaped seal may be required to maintain an effective seal at typical operating temperatures. Exemplary geometric shapes include rings (i.e., donuts), strips (both shown in FIG. 1), or rectangles (i.e., windows) (shown in FIG. 2) or any combination thereof. Multiple member seals of the present invention will be particularly useful at any junction where the seal is presenting a barrier to the reducing environment, i.e. the fuel/water flow, such as hydrogen or hydrocarbon fuel (including methane, natural gas, etc.) and water vapor, of the fuel cell system. Other seal shapes may be used for other configurations.

FIG. 1A shows the air side of an exemplary interconnect 1. The interconnect may be used in a stack which is internally manifolded for fuel and externally manifolded for air. The interconnect contains air flow grooves 2 to allow air to flow from one side 3 to the opposite side 4 of the interconnect. Ring seals 5 are located around fuel manifold riser openings 6. Strip seals (not shown) are located on lateral sides of the interconnect 1.

Figure 1B:
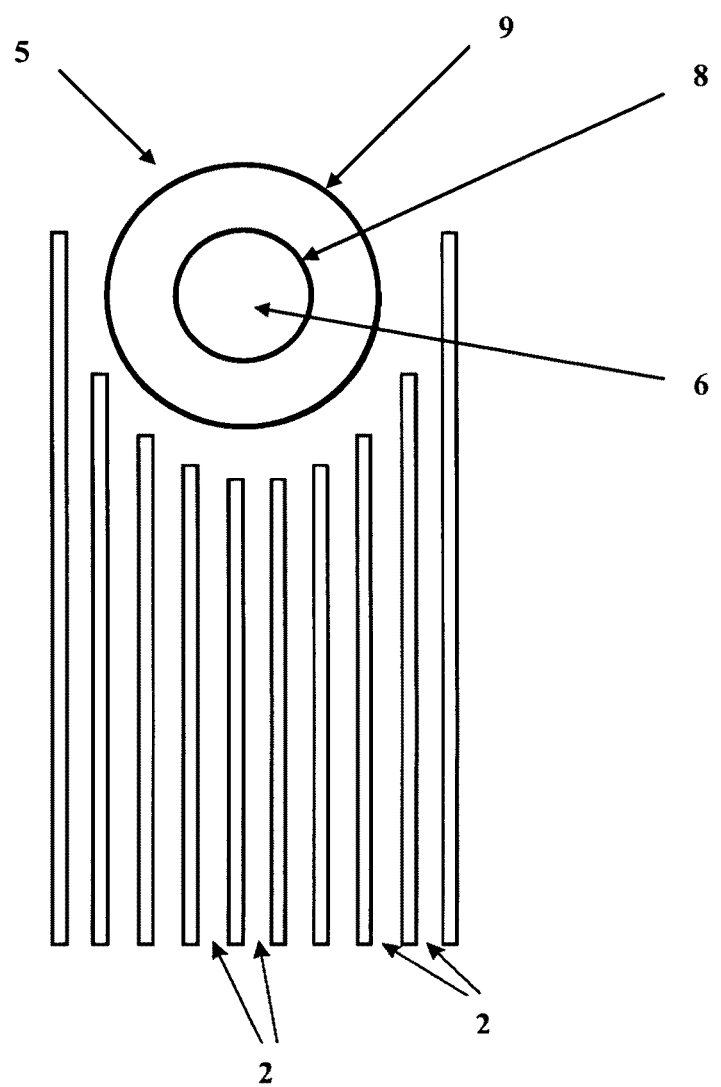
FIG. 1B is a close up view of an exemplary multiple member donut bather seal.

FIG. 1B shows a close up view of an exemplary seal 5. Seals 5 and lateral strip seals contain a metal seal member 8 which faces the fuel/water flow areas and a glass or glass ceramic seal member 9 which faces the air flow areas. Thus, in seals 5, member 8 is the inner seal member and member 9 is the outer seal member. In lateral seals of air sides of interconnects, member 8 would be the outer seal member and member 9 would be the inner seal member.

Figure 2:
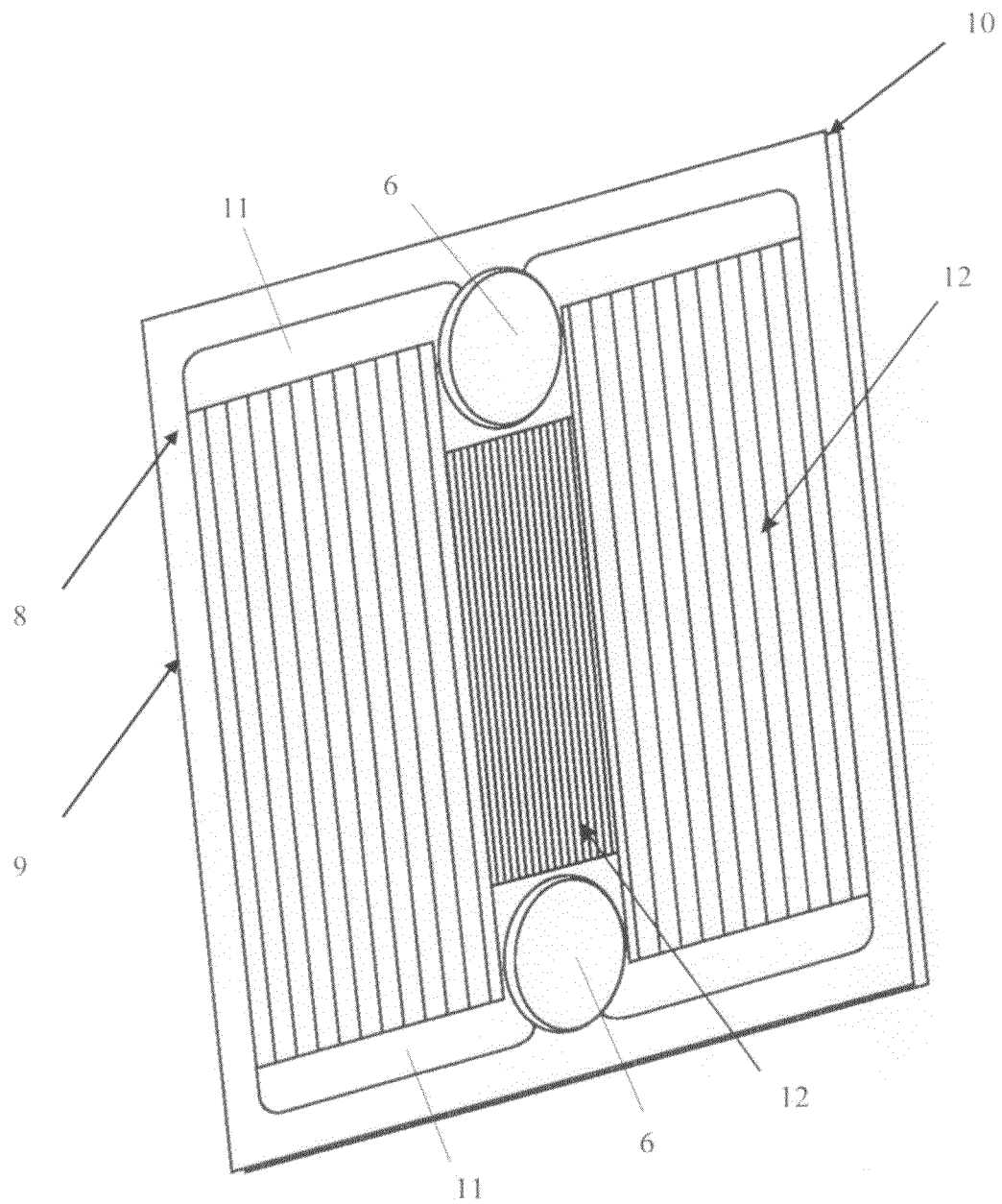
FIG. 2 is a three dimensional view of an exemplary interconnect from a SOFC with a multiple member window barrier seal.

FIG. 2 illustrates the fuel side of the interconnect 1. A window seal 10 is located on the periphery of the interconnect 1. Seal 10 contains the metal seal member 8 as the inner seal member and the glass or glass ceramic seal member 9 as the outer seal member. Also shown are fuel distribution plenums 11 and fuel flow grooves 12. It is important to note that the interconnect shown in FIG. 2 has two types of fuel flow grooves 12; however, this is not a limitation of the present invention. The fuel side of an interconnect may have fuel flow grooves 12 that are all the same depth and length, or a combination of short and long, and/or deep and shallow grooves. The air side of the interconnect 1 contacts a cathode of one cell in the stack while the fuel side of interconnect 1 contacts an anode of the adjacent cell.

Multiple member seals of the first aspect of the present invention comprise a metal seal member and one or more additional seal members. In embodiments of this aspect, a metal seal member of a multiple member seal is positioned to lie between a more chemically vulnerable seal member, such as a glass or glass ceramic seal member, and a reducing environment (such as a fuel/water flow) within a fuel cell. A metal seal member may be processed into any suitable form; for example foil, wire, or felt. Preferably, the metal used for a metal seal member comprises gold, silver, nickel, tin, or any alloy thereof.

In preferred embodiments, at least one of the one or more additional seal members comprise glass or glass ceramic. Glass or glass ceramic seal members can be processed in any suitable process, such as dispensing, tape casting and tape punching. Such processes are numerous and well known in the art. Examples of materials for glass or glass ceramic second seal members include higher temperature modified borosilicate glasses with a high content of BaO and $Al_2O_3$ and lower temperature pure borosilicate glasses, although any other glass or glass ceramic material with a suitable viscosity profile can be used.

The metal seal member facing a fuel/water flow forms a protective barrier against fuel/water exposure for the second glass or glass ceramic seal member. Formation of a perfect hermetic seal by the metal first seal member is not necessary to provide a protective barrier; merely forming an effective seal is sufficient to keep the bulk of the reducing environment from contacting the more vulnerable glass or glass ceramic seal member. However, the closer the seal formed by the metal seal member is to being hermetic, the more effective the protective barrier will be, thus allowing for a longer effective lifespan of the glass or glass ceramic seal member.

Irrespective of the geometric shape adopted by embodiments of the first or second aspects of the invention, any two seal members can be positioned such that they are in contact (i.e., abut) or positioned such that a gap is defined between them.

Figure 3:
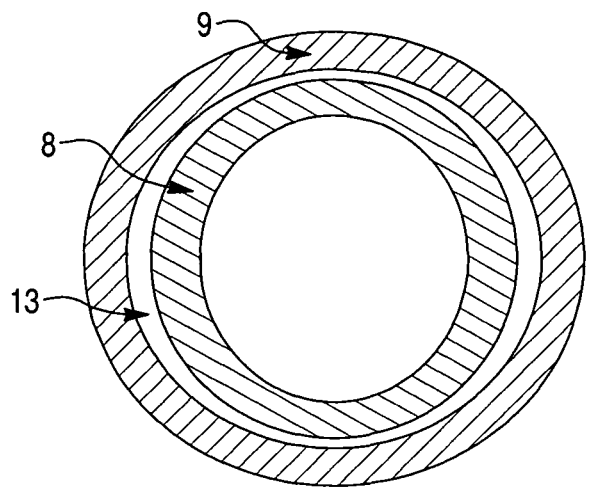
FIG. 3 is a top view of a exemplary donut seal where a gap is defined between two seal members.

An illustration of an exemplary concentric ring seal where a gap is defined between two seal members is found in FIG. 3. As seen in this figure, a gap 13 is located between an outer seal member 9 and an inner seal member 8.

Figure 4:
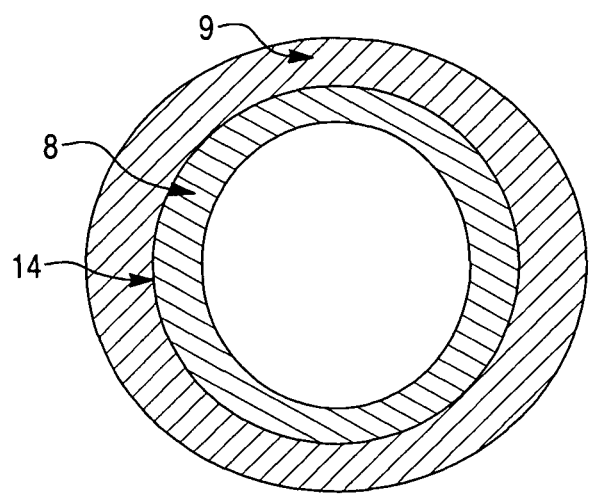
FIG. 4 is a top view of a second exemplary donut seal where two seal members abut.

An illustration of an exemplary concentric ring seal with abutting seal members is found in FIG. 4. As seen in this figure, contact at position 14 occurs between an outer seal member 9 and an inner seal member 8.

Multiple member seals useful in the second aspect of the present invention comprise one or more secondary seal members comprising a material that is chemically stable in a mixed environment (i.e., reducing flow, such as a fuel/water flow, on one side of the seal member and oxidizing flow, such as air, on the other) and one or more primary seal members. Further, a gap is defined between the secondary seal member and the primary seal member such that at least one channel is defined through which a protective oxidizing flow is flowed. In this type of seal, the one or more secondary seal members are located in the fuel cell stack such that the fuel/water is on one side of the seal member and the one or more secondary seal members need only form an effective, but not hermetic, seal. Materials useful in constructing primary and secondary seal members may be processed in any suitable process, such as dispensing, tape casting and tape punching. Such processes are numerous and well known in the art.

Embodiments of seals according to the second aspect of the present invention utilize one or more primary seal members to effectively isolate areas of the fuel cell stack from either the outside atmosphere or areas of air flow within the fuel cell stack and one or more secondary seal members prevent reducing flow inside of the fuel cell system from contacting and degrading the primary seal members. Preferably, at least one of the one or more primary seal members comprises a glass or glass ceramic seal member. The secondary seal members comprise a material capable of forming merely an effective seal at typical SOFC operating temperatures. The material of the second seal members also must be relatively chemically invulnerable to the reducing atmosphere. For example, a secondary seal member may comprise a metal or metallic felt. Preferably, the metal or metallic felt used for a secondary seal member will comprise gold, silver, nickel, tin, or any alloy thereof.

Examples of materials envisioned for use in preferred glass or glass ceramic primary seal members include higher temperature modified borosilicate glasses with a high content of BaO and $Al_2O_3$ and lower temperature pure borosilicate glasses, although any other glass or glass ceramic material with a suitable viscosity profile can be used.

In embodiments of these aspects, SOFC components are adapted to allow for an oxidizing flow to enter a channel defined between the outermost secondary seal member and the innermost primary seal member at a pressure lower than the pressure of the reducing flow. As indicated above, in these embodiments the secondary seal members need not form a hermetic seal; a small amount of leakage of the reducing environment into the channel between the seal members is acceptable. Due to the differences in the pressures of the reducing flow and oxidizing flows found on either side of the secondary seal, any leakage across the seal will be in the form of the reducing flow entering the oxidizing flow in the channel. Thus, the oxidizing flow in the channel will act as a protective buffer in that any reducing environment that escapes containment will contact the protective oxidizing flow in the channel and be neutralized before it can contact the outermost primary seal member. For this reason, the one or more primary seal members need not be chemically invulnerable to a reducing atmosphere. The primary seal members do, however, need to be able to hermetically form and maintain a seal at typical SOFC operating temperatures. Preferably, the one or more primary seal members hermetically seal the fuel cell system at these temperatures.

SOFC components can be adapted in a number of ways to allow for the low pressure oxidizing gas flow to flow through the chamber described above. In preferred embodiments, the SOFC system is a planar stack system utilizing planar electrolytes and interconnects. In these embodiments, the planar electrolytes (for electrolyte supported cells) have small vent holes or perforations in electrolyte and optionally in electrodes that allow a portion of the oxidizing flow to enter the channels described above. For electrode supported cells, the holes may be formed in the electrodes.

Figure 5:
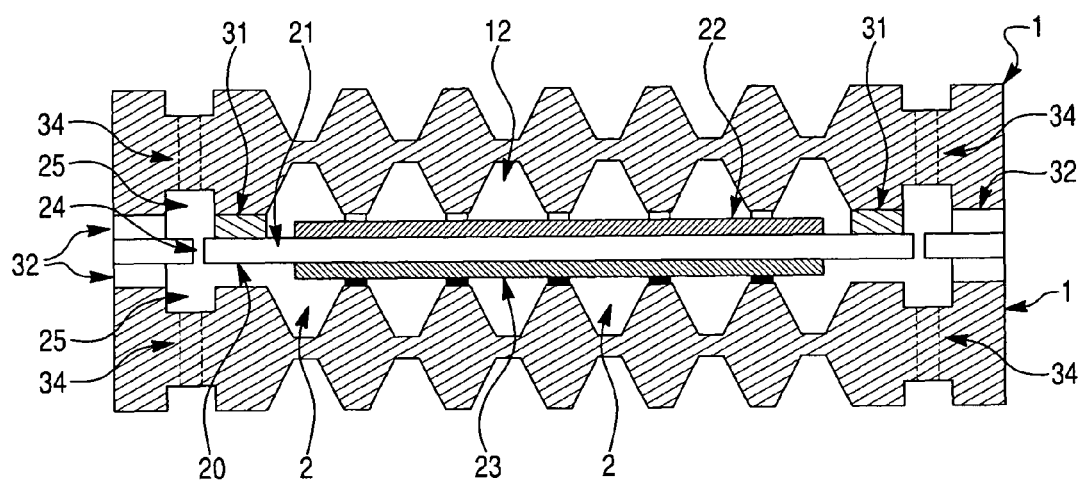
FIG. 5 is a side cross sectional view of repeating elements in an exemplary SOFC stack employing a multiple member seal of the third and fourth aspects of the present invention.

FIG. 5 shows a portion of an exemplary SOFC stack including repeating planar interconnects 1 and fuel cells 20 utilizing seals according to the second aspect of the present invention. Each fuel cell 20 includes an electrolyte 21, anode electrode 22, and cathode electrode 23. This illustration is not meant to be limiting because, as stated above, embodiments of seals useful in the present invention may be fabricated in any geometric shape necessary to contain the reducing flow. Respective air and fuel flow grooves and channels 2 and 12 in interconnect 1 are defined between each respective electrode 22, 23 and the interconnects that lie above and below the electrodes. The reducing flow (e.g., fuel and water) is passed in fuel flow grooves 12, and the oxidizing flow (e.g., air) is passed in the air flow grooves 2.

Air flows from grooves or channels 2 into chamber 25 which is bounded on opposite sides by the primary 32 and secondary 31 seals. The air flowing into chamber 25 flows from either air channels in the lower interconnect through opening 24 in the electrolyte or from air channels above and below the upper interconnect through opening 34 in the upper and lower interconnects 1. Opening 34 in the interconnect is indicated in FIG. 5 by dashed lines. Note that any combination of openings 24 and openings 34 may be utilized in various embodiments of the present invention to provide air flow to chambers 25 in a fuel cell stack. For example, in some embodiments, only opening 24 in the electrolyte is present. In other embodiments, only openings 34 in the interconnects are present. In still other embodiments, both openings 24 and 34 are present. Fuel leaks from grooves 12 through semi-permeable secondary seal 31 into chamber 25. Air and fuel form a protective environment in chamber 25 that protects primary seal 31.

In the third aspect of the present invention, at least two compositionally distinct glass or glass ceramic seal members are used to reduce the contact of the reducing environment in an SOFC system and more chemically vulnerable glass or glass ceramic seal members. The first type of seal member is preferentially composed of a glass or glass ceramic that is more chemically stable in a reducing environment than the second type of seal member. The second type of seal member is preferentially composed of a glass or glass ceramic that has a coefficient of thermal expansion (CTE) that is a better match to the other materials used in construction of other SOFC components.

As discussed above, it is generally desired that SOFC seal members have similar CTE to other components of the SOFC stack in order to minimize mechanical stresses that would otherwise lead to cell cracking and delamination during thermal cycling. However, there are certain seal locations within a SOFC stack where it is advantageous to use a chemically invulnerable seal material, even at the cost of a greater CTE mismatch. These include seal locations where contact between the seal and the reducing environment (i.e., fuel flow) is greatest, such as at fuel inlets and outlets, and optionally near the fuel inlet manifold.

Thus, in embodiments of this aspect, relatively more chemically stable in reducing environment glass or glass ceramic first seal materials (i.e., fuel tolerant materials) are used in locations of a SOFC system where contact with the reducing environment (i.e., fuel flow) is greatest, and CTE-matched glass or glass ceramic second seal materials are used in locations where minimizing mechanical stresses is more important than chemical stability, such as for seal locations with relatively large contact areas between the SOFC components and seal members, as well as any location where the seals are not in contact with the reducing environment. In preferred embodiments, chemically stable first seal materials are used in locations such as in areas near the fuel inlet manifold or plenum 11 and/or the fuel inlets and outlets (such as the fuel inlet or outlet riser openings 6, while CTE-matched second seal members are used in other seal locations that come in contact with the outside ambient or with the air inlet or outlet flows, as shown in FIGS. 1 and 2. In other words, the chemically stable first seal materials may comprise the ring seals 5 on the air side of the interconnect and/or a portion of the window seal 10 near the fuel inlet plenum 11 on the fuel side of the interconnect, while the CTE-matched second seal members comprise the strip seals 7 on the air side of the interconnect 1 or the remaining portion of the window seals 10 away from the fuel inlet plenum or manifold 11. However, in the present embodiment, each respective seal comprises a single material instead of a combination of a metal seal and a glass or glass ceramic seal materials.

Examples of materials envisioned for use in preferred chemically stable glass or glass ceramic first seal members include boron oxide ($B_2O_3$)-free glasses or glass ceramics. It is believed that boron negatively effects the seal stability in a reducing environment.

Examples of materials envisioned for use in preferred CTE-matched glass or glass ceramic second seal members include but are not limited to higher temperature modified borosilicate glasses with a high content of BaO and $Al_2O_3$ and lower temperature pure borosilicate glasses. The boron oxide containing seals have a desired CTE match to the solid oxide fuel cell stack components.

The foregoing description of the invention has been presented for purposes of illustration and description. The methods and devices illustratively described herein may suitably be practiced in the absence of any element or elements, limitation or limitations, not specifically disclosed herein. Thus, for example, the terms "comprising", "including," containing", etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the invention embodied therein herein disclosed may be resorted to by those skilled in the art, and that such modifications and variations are considered to be within the scope of this invention. It is intended that the scope of the invention be defined by the claims appended hereto, and their equivalents.

What is claimed is:

1. A fuel cell stack comprising:
a plurality of fuel cells;
a plurality of interconnects; and
a multiple member seal located between one of the plurality of fuel cells and one of the plurality of interconnects, the seal comprising:
a metal seal member; and
one or more additional non-metal seal members;
wherein said metal seal member is exposed to a first portion of the fuel cell stack which in operation contains water vapor and provides a semi-permeable seal between said first portion of the fuel cell stack and said one or more additional non-metal seal members and said one or more additional non-metal seal members is exposed to a second portion of the fuel cell stack which in operation is exposed to air; wherein said metal seal member is more permeable than said one or more additional non-metal seal members.

2. The stack of claim 1, wherein said metal seal member and an additional non-metal seal member are adjacent and positioned relative to each other such that no gaps are defined between the metal seal member and the adjacent additional seal member.

3. The stack of claim 1, wherein said metal seal member and an additional non-metal seal member are adjacent and positioned relative to each other such that a gap is defined between the metal seal member and the adjacent additional seal member.

4. The stack of claim 1, wherein said metal seal member comprises metal foil, wire, or metallic felt.

5. The stack of claim 4, wherein said metal foil, wire, or metallic felt comprises gold, silver, nickel, tin, or any alloy thereof and said fuel cell stack comprises a solid oxide fuel cell stack.

6. A fuel cell stack comprising:
a plurality of fuel cells;
a plurality of interconnects; one or more first seal members comprising a first seal material which are located within the fuel cell stack in fuel flow areas, the first seal material comprising at least one of a glass and a glass ceramic material; and
one or more second seal members comprising a second seal material composition different from the first seal material which are located within the fuel cell stack in air flow areas, the second seal material comprising at least one of a glass and a glass ceramic material;
wherein said one or more first seal members are more chemically stable in a reducing environment than said one or more second seal members; and said one or more second seal members are better coefficient of thermal expansion (CTE)-matched to the fuel cells and interconnects than said one or more first seal members.

7. The stack of claim 6, wherein at least one of said one or more first seal members comprises a boron oxide free glass or glass ceramic material.

8. The stack of claim 6, wherein at least one of said one or more second seal members comprises a borosilicate glass or glass ceramic material.

9. The stack of claim 6, wherein at least one of said first seal members comprises a ring seal which seals a fuel inlet riser opening on an air side of at least one interconnect and at least one of said second seal members comprises a strip seal on an air side of the interconnect.

10. The stack of claim 6, wherein at least one of said first seal members comprises a first portion of a window seal on a fuel side of at least one interconnect located adjacent to a fuel inlet plenum and at least one of said second seal members comprises a second portion of said window seal located distal from said fuel inlet plenum.

11. The stack of claim 1, wherein said metal seal member is separate from said one or more additional non-metal seal members.

12. The stack of claim 11, wherein said metal seal member forms an effective seal against exposure of said one or more additional non-metal seal members to the portion of the fuel cell stack which in operation contains water vapor.

13. The stack of claim 6, wherein said one or more first seal members are separate from said one or more second seal members.

14. The stack of claim 13, wherein said one or more first seal members forms an effective seal against exposure of said one or more second members to said reducing environment during fuel cell stack operation.

* * * * *